United States Patent Office 2,795,506

Patented June 11, 1957

2,795,506

PORCELAIN ENAMELS AND ARTICLES MADE THEREFROM

Benjamin J. Sweo, Lakewood, and Joseph F. Uher, South Euclid, Ohio, assignors to Ferro Corporation, Cleveland, Ohio, a corporation of Ohio No Drawing. Application July 6, 1954, Serial No. 441,685

7 Claims. (Cl. 106—48)

This invention relates as indicated to porcelain enamels and has more particular reference to porcelain enamels which will produce coatings substantially free of hydrogen produced defects.

It is well known to those skilled in the art that the application of porcelain enamel to an iron work piece is accompanied by the evolution of a gas or gases during the firing step. The successful application of porcelain enamel is thus dependent on the healing over, during the firing cycle, of the areas through which the gases escape. Failure of the porcelain enamel to seal over the holes formed by gas evolution will render the article commercially unfit.

It has been established that such defects as fishscaling, reboiling, shiner scale, spontaneous spalling, delayed spalling, copper-heading and primary boiling are due to the evolution of gases during the fusion of the porcelain enamel frit onto the iron work piece.

The present invention is based on the discovery that these gases in porcelain enamel frit can be removed and thus a porcelain enamel frit can be produced which when fired onto an iron work piece will be substantially free of all the aforementioned defects.

It is therefore a principal object of this invention to provide a new and novel porcelain enamel and a method for producing the same.

Other objects will become apparent as the description proceeds.

To the accomplishments of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises the method of producing a porcelain enamel frit which comprises reducing the particle size of porcelain enamel frit so that said frit will pass 100% through a 60 mesh sieve and then heating said frit from about 850° F. to no more than 100° F. over the interferometer softening point of said frit for no less then one-half hour.

We have found that the ability of frit to produce or not produce the aforesaid defects can be measured by what we have defined as its 1/D value. The 1/D value of any frit is the reciprocal of the apparent density of the frit and the value is obtained by testing the frit in the following manner:

Dry-milled frit and powdered iron are mixed in a proportion to give an iron content of 6.25% by weight. A 10 gram sample of the mixture is placed in a crucible and heated in an electric muffle. Three samples are used and are heated so as to bracket the firing range of the frit in question. For example if a frit with a firing temperature of 1500° is being tested, then one sample is fired at about 1400° F., the second sample is heated at about 1500° F. and the third sample at about 1600° F., all heating being done for a constant period of time. After heating the samples are allowed to solidify and the fused mass and crucible weighed in water and the apparent density determined. The reciprocal of the highest apparent density value of the three samples is then used as the 1/D value for that frit. Thus by this procedure and examination of fired work pieces we have been able to correlate the 1/D value of a frit and its ability or lack of ability to produce the previously discussed defects.

We have determined that substantially all of the commercially produced porcelain enamels have a 1/D value in the range of about 0.8 to 1.5. It is in this 1/D range that the gas defects occur and that by maintaining a 1/D value of less than 0.65 these defects are minimized. In the preferred embodiment of our invention we produce porcelain enamels with a 1/D value as close to the reciprocal of their true density as possible and thus we have porcelain enamels which produce coatings with substantially no gas defects. For example if a particular untreated enamel gives a 1/D value of 0.8 when tested as described above and according to its true density of 2.5 should have a 1/D value of 0.4, by the process of our invention we are able to treat the enamel so that when tested as described above it will actually give a 1/D value of 0.4.

By using the process of our invention, porcelain enamel frits can be produced which when admixed with the necessary mill additions will produce porcelain enamel coatings substantially free of gas defects, such as, fishscaling, blistering, copperheading, etc.

While there are innumerable varieties of porcelain enamel frits the present process can be used with any of them providing the frit does not melt and coalesce to form particles larger than 60 mesh when heated at from 850° F. to no more than 100° F. over its interferometer softening point.

While the present process has been tried with many different frits the following examples are given to illustrate typical formulations.

I

*Ground coat*

| | |
|---|---|
| Feldspar | 29.30 |
| Silica sand | 20.50 |
| Borax | 29.30 |
| Soda ash | 8.80 |
| Soda nitrate | 4.90 |
| Fluorspar | 3.90 |
| Cryolite | 2.00 |
| Manganese oxide | 0.60 |
| Cobalt oxide | 0.40 |
| Nickel oxide | 0.40 |

The foregoing ingredients are thoroughly admixed, smelted and fritted according to accepted standard procedures well known to those skilled in the art of porcelain enamel manufacture. The thus formed frit is then reduced in particle size so that it will pass 100% through a 60 mesh sieve and then heated from about 850° F. to no more than 100° F. over its interferometer softening point for no less than one-half hour.

II

*Titanium white cover coat*

| | |
|---|---|
| Feldspar | 30.60 |
| Cryolite | 10.10 |
| Zinc oxide | 4.75 |
| $TiO_2$ | 12.00 |
| Quartz | 30.80 |
| Dehydrated borax | 13.70 |
| $KNO_3$ | 3.70 |
| $BaO_2$ | 1.20 |

These ingredients when admixed, smelted and fritted and then treated as above in Example I above will also produce a porcelain enamel frit capable of making coatings substantially free of the previously discussed defects.

While the aforegoing are only two examples of innumerable frit formulations it is unnecessary to give more examples since they would merely amount to an enumeration.

In addition to producing a frit, from its raw batch ingredients, capable of making coatings substantially free of gas defects the present process is also applicable to porcelain enamel frits previously manufactured and found to produce defective coatings.

Any porcelain enamel frit with a 1/D value of 0.8 or higher can be brought down to a 1/D value wherein the frit will produce a coating substantially free of the aforementioned defects.

The frit is first reduced in particle size, as by ball milling, so that it will pass 100% through a U. S. standard 60 mesh sieve. The milled material is then heated to at least about 850° F. but no more than 100° F. above its interferometer softening point for at least ½ hour.

The time of heating can be varied since the heating period is dependent upon the efficiency of the heating means. That is, if the material is heated in a thick layer (such as in a kiln operation) the time would be much longer than if the material was heated in a rotary dryer where a comparatively thin layer is subjected to the source of heat. In the preferred embodiment of our invention we mill the frit so that 100% passes through a 200 mesh sieve and heat the resultant milled material at about 1000° F. for 1 to 2 hours.

It will be noted that in the foregoing discussion we have referred to the upper limit of heating as no more than 100° F. above the interferometer softening point of the frit. For the purpose of this invention, so that, there can be no doubt as to the exactness of meaning intended, the interferometer softening point is defined as follows: The interferometer softening point is that temperature at which the rate of deformation of a glass, when heated at 4° C. per minute exceeds the rate of expansion of that glass. The interferometer is a standard laboratory instrument and details of its operation and construction may be found in the "Bureau of Standards Journal of Research," vol. 10, No. 1, January 1933, pages 59 to 76, and in the text "Glass Research Methods," by Ralph K. Day, published by Industrial Publications Inc., Chicago 3, Illinois, 1953, pages 161 to 166.

III

A standard ground coat was found to produce fired pieces with heavy fishscaling. The 1/D was determined, as previously discussed, and found to be 0.8 whereas to produce a good surface it should have had a 1/D value of 0.4. The interferometer softening point was then determined and found to be 932° F. Since the frit was already milled to a particle size so that it would pass 100% through a 200 mesh sieve it was unnecessary to do any further milling. The milled material was then heated at 1000° F. in a kiln for about 2 hours. After the heating operation the 1/D value was again determined by the test method previously described and found to be 0.4. This material when fired onto iron work pieces produced coatings substantially free of fishscaling defects.

We have also found that the present invention can be used to reclaim spray-booth scrapings. In the past spray-booth scrapings had to be discarded since pieces coated with such scrapings showed such severe gas defects as to make pieces commercially unfeasible. This was particularly true where titanium opacified cover coat porcelain enamels were applied directly to the work piece without ground coats. By screening the scrapings through a 60 mesh sieve to break up the lumps and then heating the material at from about 850° F. to no more than 100° F. above the interferometer softening point of the contained porcelain enamel we have produced a material which when applied directly to, or over a ground coated iron work piece, will show substantially no gas defects.

The frits produced by the present invention, whether made directly from the raw batch ingredients or from the treatment of previously made frits, can be left in storage without fear of later producing coatings with gas defects. These frits are handled and applied to iron work pieces by any of the methods currently used in the porcelain enameling art. The following example is given as a typical method for preparing the frit of Example I for spraying onto a work piece.

IV 100 lbs. frit of Example I
5 lbs. low-set clay
2 lbs. high-set clay
1/16 lb. bentonite
¼ lb. borax hydrous
45 lbs. water These ingredients when thoroughly admixed form a porcelain enamel slip which when sprayed and fired onto an iron work piece produces a coating substantially free of the previously discussed defects.

From the foregoing discussion it will be readily seen that for the first time ground coat and cover coat porcelain enamels can be commercially produced which will produce coatings substantially free from gas produced defects.

Other modes of applying the principle of the invention may be employed, change being made as regards the details described, provided the feature stated in any of the following claims or the equivalent of such be employed.

We, therefore, particularly point out and distinctly claim as our invention:

1. The method of producing a porcelain enamel frit which comprises admixing porcelain enamel raw batch ingredients, smelting said admixture in a smelter until molten, fritting said molten material, reducing the particle size of said fritted material until it will pass 100% through a 60 mesh sieve and then heating said material at from about 850° F. to no more than 100° F. over the interferometer softening point of said porcelain enamel for at least one-half hour.

2. The method of conditioning a porcelain enamel frit which comprises reducing the particle size of the frit so that it will pass 100% through a 60 mesh sieve and then heating said material at from about 850° F. to no more than 100° F. over the interferometer softening point of said porcelain enamel for at least one-half hour.

3. The method of conditioning a porcelain enamel which comprises collecting porcelain enamel spray-booth scrapings and then heating said scrapings at from about 850° F. to no more than 100° F. over the interferometer softening point of said porcelain enamel for at least one-half hour.

4. As a composition of matter having a 1/D value of no more than 0.65 the product produced according to claim 1.

5. An iron work piece having a porcelain enamel coating fired on at least one surface thereof, said porcelain enamel produced by the method of claim 1.

6. An iron work piece having a porcelain enamel coating fired on at least one surface thereof, said porcelain enamel produced by the method of claim 2.

7. An iron work piece having a porcelain enamel coating fired on at least one surface thereof, said porcelain enamel produced by the method of claim 3.

References Cited in the file of this patent

UNITED STATES PATENTS 2,332,423 Zwermann ____________ Oct. 19, 1943